(12) United States Patent
Cody

(10) Patent No.: US 8,757,798 B2
(45) Date of Patent: Jun. 24, 2014

(54) EYEWEAR FRAME

(71) Applicant: Tom Cody, Camarillo, CA (US)

(72) Inventor: Tom Cody, Camarillo, CA (US)

(73) Assignee: Cody Air LLC, Camarillo, CA (US)

( * ) Notice: Subject to any disclaimer, the term of this patent is extended or adjusted under 35 U.S.C. 154(b) by 0 days.

(21) Appl. No.: 14/014,184

(22) Filed: Aug. 29, 2013

(65) Prior Publication Data

US 2014/0063442 A1 Mar. 6, 2014

Related U.S. Application Data

(60) Provisional application No. 61/696,020, filed on Aug. 31, 2012.

(51) Int. Cl.
*G02C 5/22* (2006.01)
*G02C 1/08* (2006.01)

(52) U.S. Cl.
CPC ............... *G02C 5/22* (2013.01); *G02C 5/2209* (2013.01); *G02C 1/08* (2013.01); *G02C 2200/10* (2013.01)
USPC .............................. 351/153; 351/121; 16/228

(58) Field of Classification Search
CPC .......... G02C 1/08; G02C 5/2209; G02C 5/22; G02C 5/2218; G02C 2200/10
USPC ........... 351/90–102, 111, 113, 114, 116, 121, 351/153; 16/228
See application file for complete search history.

(56) References Cited

U.S. PATENT DOCUMENTS

| | | | |
|---|---|---|---|
| 3,436,761 A | 4/1969 | Liautaud et al. | |
| 7,338,157 B1 * | 3/2008 | Leung et al. | ................... 351/153 |
| 7,712,894 B2 | 5/2010 | Tsai | |
| 2002/0054272 A1 | 5/2002 | Ebata | |
| 2003/0058402 A1 | 3/2003 | Conner | |
| 2005/0225717 A1 | 10/2005 | Reane | |
| 2005/0251960 A1 | 11/2005 | Kanou et al. | |
| 2010/0208193 A1 * | 8/2010 | Dollay | ............................ 351/90 |

FOREIGN PATENT DOCUMENTS

FR 2940473 6/2010
WO WO2008/129355 10/2008

* cited by examiner

*Primary Examiner* — Huy K Mai
(74) *Attorney, Agent, or Firm* — Cislo & Thomas, LLP

(57) ABSTRACT

An eyewear utilizing a screw-less hinge to connect the temple to the frame. The frames terminate laterally at an open, curved rung configured to receive a cylinder. This cylinder is fixed to the temple. Due to the configuration of the curved rung, the cylinder can be inserted into the curved rung in a rotatable or pivotable fashion. The cylinder receiving the curved rung holds the frame together and keeps eye wires from opening, thus keeping lenses from falling out of the eyewear. A wedge tool can be used to displace the curved rung from the cylinder to easily remove the temple from the frame.

5 Claims, 6 Drawing Sheets

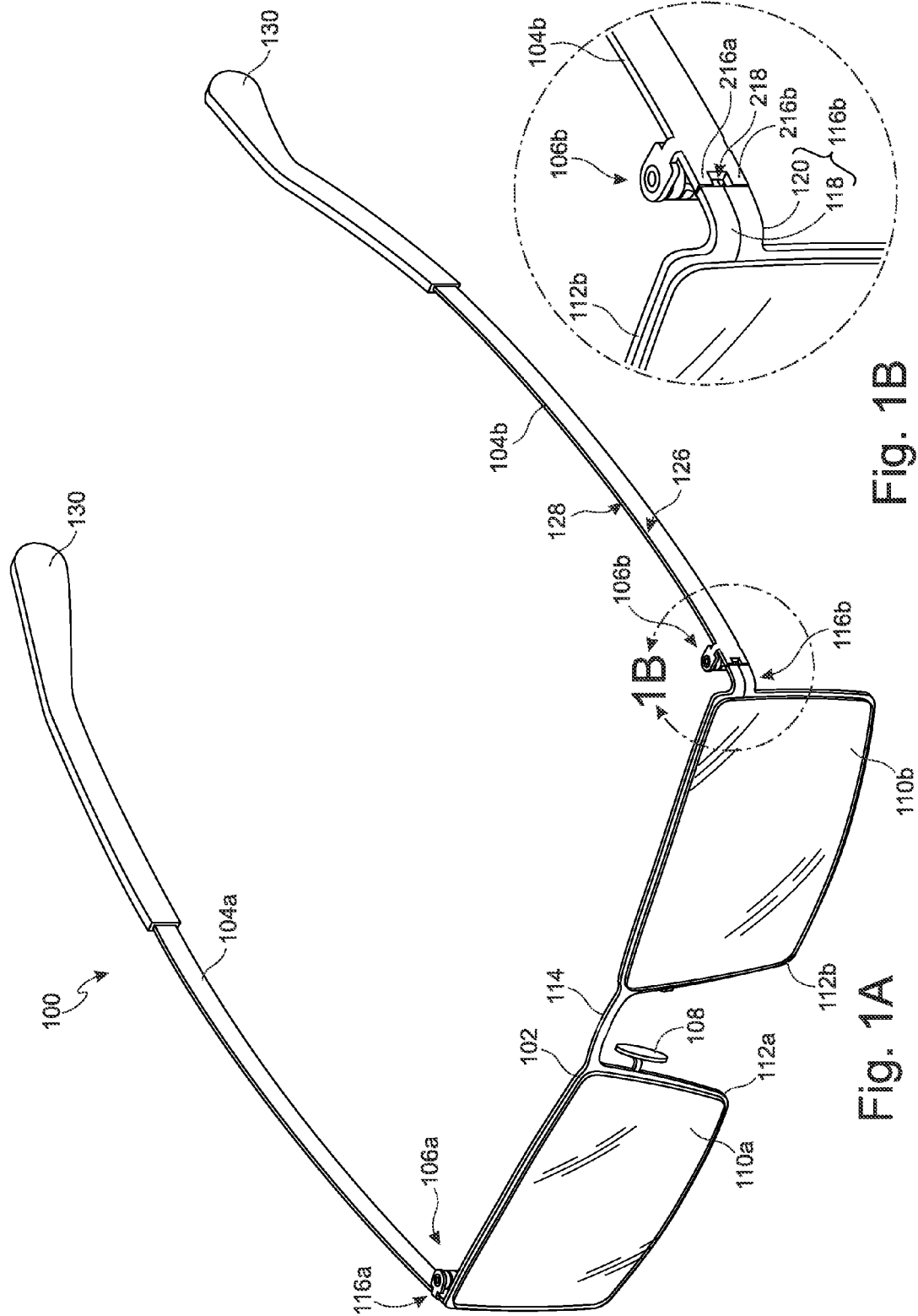

EYEWEAR FRAME

CROSS-REFERENCE

This patent application claims the benefit of U.S. Provisional Patent Application Ser. No. 61/696,020, entitled "Eyewear Frame," filed Aug. 31, 2012, which application is incorporated in its entirety here by this reference.

TECHNICAL FIELD

This invention relates to eyewear frames.

BACKGROUND

Eyewear can be worn as a fashion statement, for correcting vision, or for protection. In any case, most of the population wears, has worn, or will wear eyewear for one of those reasons. Most eyewear are constructed with the same standard parts: a frame that holds lenses, temples connected to the frame to secure the frame to the face, and nose pads for comfort. The temples are connected to the frame by a hinge mechanism. The hinge utilizes one very tiny screw. The hinge portion tends to receive a lot the stress of the eyewear causing damage to the hinge or loosening of the screw. When this happens it is difficult or inconvenient to fix because the screw is so small and requires small tools. This mechanism also makes it difficult to replace or change temples. In addition, some frames have split end pieces so that when the hinge is removed, the lenses can be removed. In these types of glasses, replacing the lenses is a tedious task.

Therefore, there is a need for new eyewear utilizing a hinge mechanism that makes it easy to take the temples on and off.

SUMMARY

The present invention is directed to eyewear utilizing a screw-less hinge to connect the temple to the frame. The frames terminate laterally at an open, curved rung configured to receive a cylinder. This cylinder is fixed to the temple. Due to the configuration of the curved rung, the cylinder can be inserted into the curved rung in a rotatable or pivotable fashion. A wedge tool can be used to displace the curved rung from the cylinder to easily remove the temple from the frame.

BRIEF DESCRIPTION OF DRAWINGS

FIG. 1A shows a perspective view of an eyewear of the present invention,

FIG. 1B shows a close-up of the section indicated as 1B in FIG. 1A.

DETAILED DESCRIPTION OF THE INVENTION

Figure 2A:
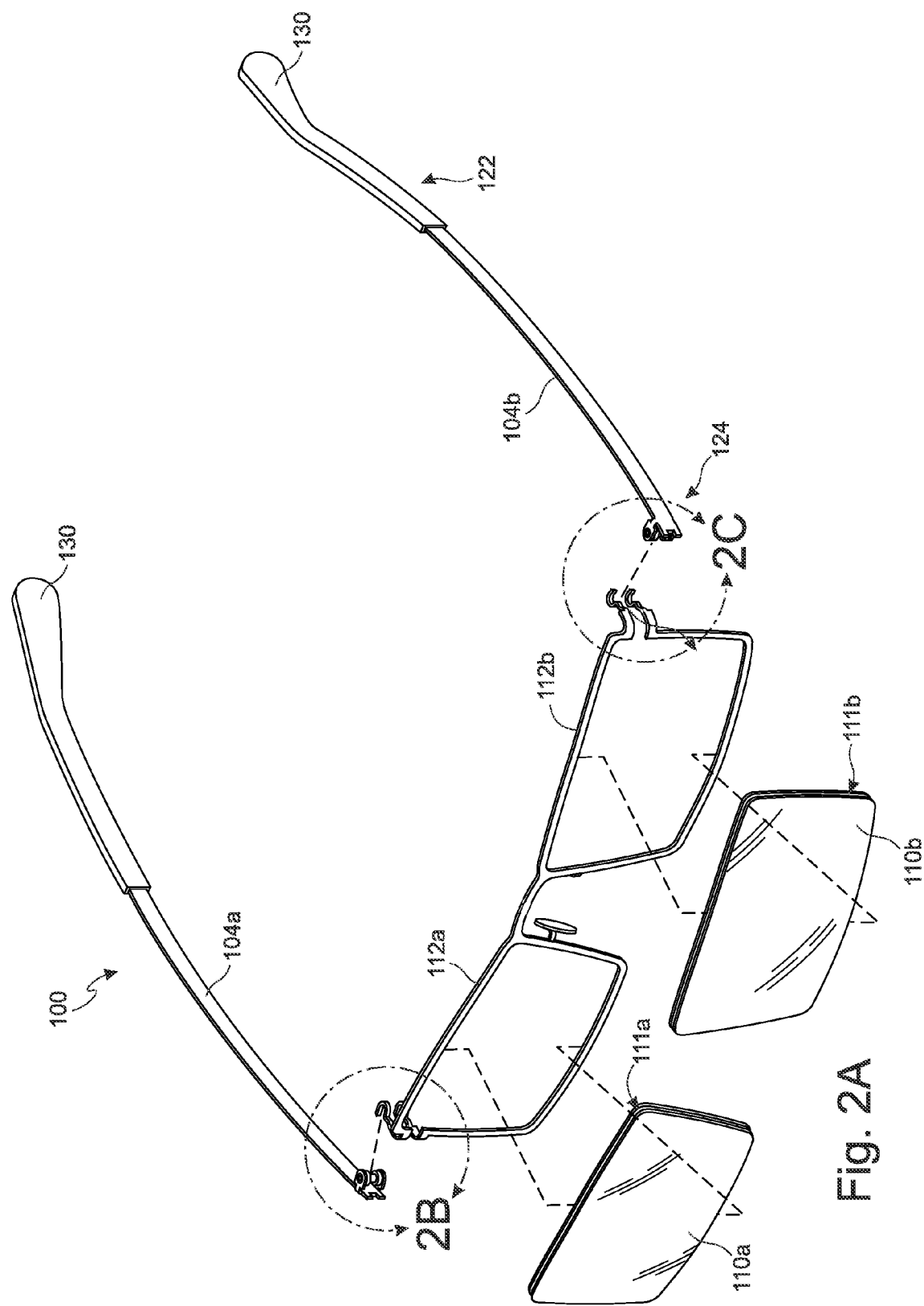
FIG. 2A shows an exploded view of the eyeglass shown in FIG. 1A.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is directed towards eyeglasses having a unique hinge mechanism that allows the temples to be easily removed and replaced without the use of screws. As shown in FIG. 1A, the eyeglass 100 comprises typical parts of an eyeglass, including a frame 102, a pair of temples 104a, 104b attached to the frame by hinge mechanisms 106a, 106b, and a pair of lenses 110a, 110b. The eyeglass 100 may also have a pair of nose pads 108.

For ease of description only, the present invention will be described with positional nomenclature reflecting the eyeglass being properly worn by a user in the standing or sitting position. Therefore, "anterior" or "anteriorly" means in the forward direction or forwardly towards the front (e.g. towards the face), "posterior" or "posteriorly" means rearwardly or towards the back (e.g. towards the back of the head), "lateral" or "laterally" means towards the sides (e.g. towards the ears), and "medial" or "medially" means towards the center (e.g. towards the nose). These terms can be combined for additional clarification regarding a particular direction. For example, a direction that is laterally and posteriorly refers to a diagonal direction towards the back and away from the user.

The frame 102 may be made out of metal, plastic, rubber or other similar materials. The frame 102 comprises a pair of eye wires or rims 112a, 112b, a bridge 114 connecting the pair of eye wires 112a, 112b at a middle of the frame 102, with each eye wire 112a, 112b terminating laterally at their respective end pieces 116a, 116b. In some embodiments, the frame 102 may comprise a single eye wire 112 to hold a single lens 110.

Figure 2B:
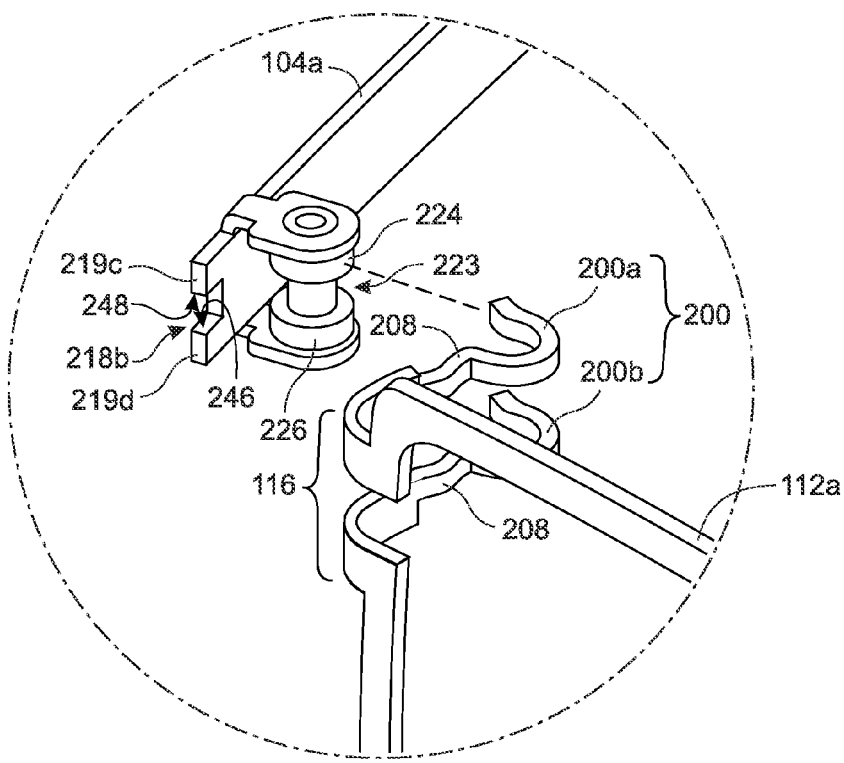
FIG. 2B shows a close-up of the section indicated as 2B in FIG. 2A.
Figure 2C:
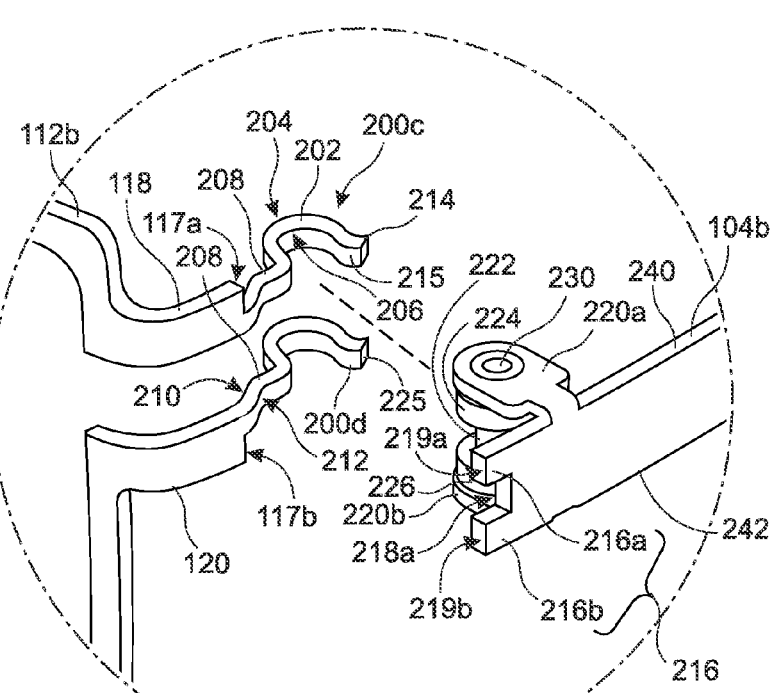
FIG. 2C shows a close-up of the section indicated as 2C in FIG. 2A.
Figure 3:
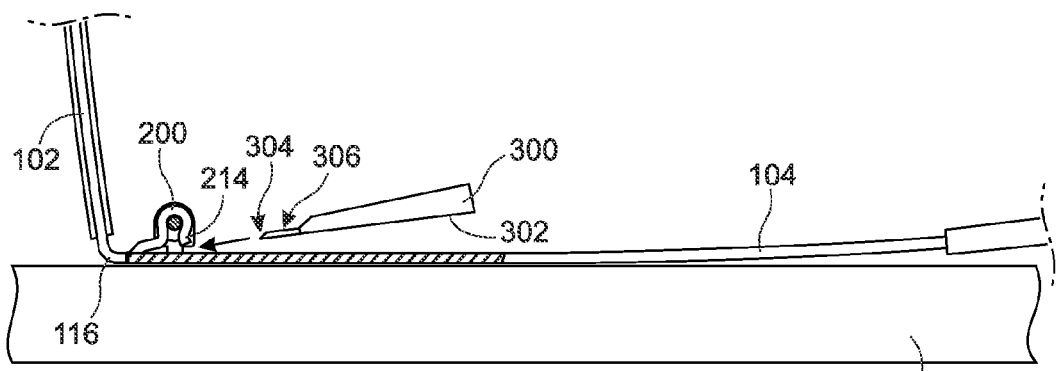
FIGS. 3-6 show the process of removing the temple from the frame.

In some embodiments, each eye wire 112a, 112b may be configured with an in-line groove so that the lenses 110a, 110b can be snapped into the frame 102. In such embodiments, the frame may be a one-piece, whole frame. In some embodiments, the lenses 110a, 110b may have the in-line groove 111a, 111b into which the eye wires 112a, 112b can be seated. In such embodiments, the eye wires 112a, 112b may be split at the end pieces 116a, 116b to define a top eye wire rim portion 118 that is separated from a bottom eye wire rim portion 120 as shown in FIGS. 2A-2C. This allows the lenses 110a, 110b to be removed easily.

Each end piece 116a, 116b may terminate away from the eye wire 112a or 112b with an eye wire rung 200. FIG. 2B is a close-up illustration of the right side showing the right, top eye wire rung 200a and the right, bottom eye wire rung 200b. FIG. 2C is a close-up illustration of the left side showing the left, top eye wire rung 200c and the left, bottom eye wire rung 200d. As the features of the hinge mechanisms 106a and 106b for the left and right side, and the split and non-split end piece, are similar, these features will be discussed with reference to one side; however, the description applies equally to both sides. Frames 102 that are semi-rimless (not containing a rim all the way around the front) or do not require the changing of the lens by taking the end pieces 116a, 116b apart can have one rung 200 on each side instead of two rungs 200a, 200b, or 200c, 200d (i.e. top and bottom). Similarly, a plastic front where the lenses 110a, 110b can be popped in and out by hand may only require one rung 200 on each side to hold the temple to the front of the frame.

The eye wire rung 200 comprises an arc shaped bend 202 defined by a convex inner surface 204 projecting in a medial direction towards the middle of the frame 102 and a concave outer surface 206 facing laterally and outwardly away from the frame 102. The arc shaped bend 202 terminates at a free end or tip 214 on one side and is connected to the frame 102 on the opposite side. In some embodiments, the eye wire rung 200 is connected to the end piece 116 by an eye fire arm 208. In the split end piece embodiments, the eye wire arm 208 will similarly be split like the top and bottom arms 118, 120. In some embodiments, the eye wire arm 208 may be slightly recessed or bent inwardly towards the middle of the frame so as to define a small convex inner surface 210, and a small concave outer surface 212 facing laterally outward. In some embodiments, the tip 214 of the arc shaped bend 202 may comprise a slight curve defining a slight protrusion 215 forwardly towards the end piece 116, with the free end 214 projecting towards the temple tip 130 of the temple 104. These configurations of the end piece 116 facilitate connection with the temple 104 as will be discussed below.

The temples 104a, 104b are elongated arms that extend rearwardly to mount on the wearer's ears. The temples 104a, 104b generally define an outer surface 126, and an inner surface 128 that abuts the side of the wearer's head. The rearward portion 122 of the temple may comprise a temple tip 130 for comfort. The forward portion 124 of the temple 104 is configured to form a hinged connection with the end piece 116.

The features of the temples 104a and 104b are similar. Therefore, only one temple 104 will be described, but the description applies to both temples 104a, 104b. The forward portion 124 of the temple 104 may terminate with a stopper 216. The stopper 216 abuts against the end piece 116 (as described in more detail below) when the temples 104 are in the open configuration. This prevents over-rotation of the temples 104 past approximately 90 degrees relative to the frame (as shown in FIG. 1A) allowing a secure fit on the face. In some embodiments, the stopper 216 may have a recess 218 into which the eye wire arm 208 can fit. The recess 218 divides the stopper 216 into a top stopper 216a and a bottom stopper 216b. The top and bottom stoppers 216a, 216b can then abut the top and bottom eye wire arms 118, 120, respectively, either directly or at the eye wire arms 208.

This allows the temples to have a snug and secure fit on the face of the user by not allowing the temples to continue to extend outward past the 90 degrees. In addition the stoppers 216a, 216b serve a second purpose in that they may also hold the eye wire rung 200, particularly the split rungs, securely in place. The inner, top 248 and inner, bottom 246 surface edge or plain of the stoppers 216a, 216b aid in holding the two arms 118, 120 of the eye wires and lens securely in place for additional reinforcement with added inward pressure against the eye wire arms 208.

As shown in FIG. 2C, the negative space or recess 218a between the stoppers 216a, 216b on the temples 104 are designed to accommodate the eye wire arms 208 located next to the eye wire rungs 200 on the end-piece 118, 120. This negative space 218a on the temple 104 may allow the eye wire arms 208 to interlock or abut with the temple 104 and the front of the frame 102. This interlocking or abutting fit gives additional pressure and security by preventing the eye wire 112 from opening or coming loose and keeping the lenses 110a, 110b intact. The eye wires 112a, 112b on the front that hold the lenses 110a, 110b intact may be held together with the temples 104a, 104b and reinforced with the axially inward pressure of the stoppers 216 located on the temples 104a, 104b, thereby holding the eye wire arms 208 in alignment. In addition, the eye wires 112a, 112b may be held together by the axially inward pressure of the flanges 224, 226 on the cylinder 222. These configurations create a cosmetically clean and almost seamless transition between the front of the frame and the temples.

In the preferred embodiment, the stopper 216 has front surface areas 219a, 219b that abut or mate with rear surface areas 117a, 117b of the eye wire end piece 116 of the frame 102 to prevent the temple 104 from over rotating. This flush fit (FIG. 1B) of the rear surface 117a, 117b of the end piece 116 and the front surface 219a, 219b of the two stoppers 216a, 216b on the temple 104a or 104b may also create an added reinforcement of the eye wire 112 from opening and preventing the lens from falling out.

Adjacent to the stopper 216 are a pair of tabs 220a, 220b projecting medially and parallel to each other, but at approximately 90 degrees to the outer and inner surface 126, 128 of the temple 104a or 104b. The two tabs are bent inward toward the middle of the frame 102 at a 90 degree angle from the top edge 240 and bottom edge 242 of the temple 104a or 104b. One tab 220a is located on the top edge 240 and one tab 220b is located on the bottom edge 242 of the temple 104a or 104b. The hole or indentation near the center of the tabs 220a, 220b are designed to accommodate and hold a fastener 230, such as a screw, rivet, spindle, cylinder or molded plastic or similar material in place. The fastener 230 may also act as the cylinder itself by dissecting through the top and bottom tabs and interlocking with the two eye wire rungs 200 on the front of the frame 102.

In the preferred embodiment, the tabs 220a, 220b are configured to hold a cylinder 222 to form part of the hinge mechanism 106b. In some embodiments, the cylinder 222 may be integrally formed with the tabs 220a, 220b as a one-piece unit. The main portion or cylindrical body of the cylinder 222 is configured to be inserted into the space defined by the concave outer surface 206 of the eye wire rung 200. Therefore, the diameter of the cylinder 222 is essentially similar to the diameter of the space defined by the concave outer surface 206 of the eye wire rung 200. This permits the temple 104 to rotate from a closed configuration to an open configuration.

In the preferred embodiment, the cylinder 222 may comprise flanged ends or heads 224, 226 at opposite ends of the cylinder 222. These flanged ends 224, 226 are concentrically arranged with the cylinder 222 but have diameters that are larger than the diameter of the cylinder 222, thereby defining a recessed channel 223 defined by the flanged ends 224, 226 and the cylindrical body of the cylinder 222. In such an embodiment, the eye wire rung 200 is seated inside the recessed channel 223 and abutted against the flanged ends 224, 226. In embodiments in which the eye wire rung is split, the flanged ends 224, 226 facilitate keeping the split eye wire rungs 200a, 200b or 200c, 200d together. The connection of the one or two eye wire rungs 200 to the cylinder 222 hold the front of the frame 102 to the temples 104a, 104b and also prevent the lens 110a, 110b from falling out.

The flanged ends 224, 226 on the top and bottom of the cylinder 222 are calibrated to hold the eye wire rungs 200 in place when rotating the temples 104 about the axis of the cylinder. The two flanged ends 224, 226 on the top and bottom of the cylinder 222 keeps the rungs in alignment in the channel 223 of the cylinder 222 with a tight fit. The flanged ends 224, 226 of the cylinder 222 apply axially inward pressure to hold the two rungs 200a, 200b or 200c, 200d in place and in alignment around the cylinder 222 when snapped in place.

In some embodiments, the cylinder 222 may not have any flanged heads on the top and bottom of the cylinder 222. In such embodiments, the eye wire rungs 200 may be thick enough to span across the gap between the top tab 220a and bottom tab 220b of the temple 104 so as to hold the eye wires rungs 200 in place around the entire cylinder 222 also securing the lens. In other words, the thickness of the eye wire rungs 200 may be substantially similar to the height of the cylinder 222 without any flanged heads.

To secure the cylinder 222 in between the tabs 220, the cylinder 222 may have a central hole and the tabs may have through holes such that placement of the cylinder 222 in between the tabs 220a, 220b allows the central hole of the cylinder 222 to align concentrically with the holes of the tabs 220a, 220b permitting a fastener 230, such as a rivet, pin, peg, screws, spindles, solder and the like to be inserted through the hole of the tabs and cylinder 222 to secure the cylinder 222 to the tab 220.

In some embodiments, the flanged ends 224, 226 of the cylinder 222 may have an opening, such as a through hole, recess, dimple, and the like, and the tabs 220a, 220b of the temple 104 may each have a protrusion or indentation towards each other that is configured to be seated inside the hole, recess, dimple, etc. of the flanged ends 224, 226 to secure the cylinder 222 in place.

In some embodiments, the cylinder 222 may be designed to rotate about its axis or be in a fixed position. In one embodiment, the cylinder 222 can have a fixed configuration where the rungs 200 rotate about an axis around the cylinder 222. For example, the cylinder 222 may be soldered in place between the tabs 220a, 220b on the top and bottom in order for a secure fit and prevent the cylinder 222 from coming loose. In another embodiment, the cylinder 222 can rotate about its axis in between the tabs 220a, 220b and the rungs 200 are in a fixed configuration relative to the cylinder 222.

In some embodiments, the temple 104 may be a molded or hand-made plastic or similar material with an embedded or integrally formed cylinder molded or inserted into the temple 104. The inside surface of the top and bottom of the molded cavity that would accommodate the cylinder 222 on the temple 104 can also act as a "vice" and apply an axially inward pressure to hold the two eye wires rungs 200 in place. This "vice" may also secure the front to the temples and hold the eye wires together keeping the lenses from falling out.

The diameter or inner circumference of the rungs 200 are calibrated precisely in order for the rung 200 of the eye wire 112 to be tight and secure, yet provide a smooth fit around the cylinder 222 when locked in place. This precise calibration is important in order to keep the rungs 200 correctly aligned in place between the flanged ends 224, 226 on the cylinder 222. This prevents the temples 104 from becoming loose and losing the lens 110. The precise calibration is also important to prevent too much friction and reduce stress fractures in the rungs 200 of the eye wire 112 and/or cylinder 222 while maintaining a secure fit. The outward curve on the tip 214 of the eye wire rungs 200 creates a smooth area on the inner surface 206 of the rungs 200 which allows the cylinder 222 to snap in place with ease while preventing the materials from bending, breaking or wearing on the end of the eye wire or eroding the surface area of the cylinder 222 it rotates on.

In the preferred embodiment, the eye wire rungs 200 are curved slightly smaller than the channel 223 diameter on the cylinder 222 or are substantially similar to the channel 223 size. The semi-circular shape and size of eye wire rungs 200 create a radially inward force to inter-lock with the channel 223 on the cylinder 222 located between the flanged ends 224, 226 on the temple 104. The eye wire rungs 200 will snap into place on the channel 223 of the cylinder between the top and bottom flanged heads 224, 226. The very tip 214 of the eye wire rungs 200 are slightly curved outwardly away from the frame in a lateral and posterior direction to allow the eye wire rungs 200 to snap smoothly in place around the cylinder 222 and create tension on the cylinder 222. In other words, the free ends 214 will not catch the cylinder 222 as it is being inserted into the eye wire rung 200.

Figure 4:
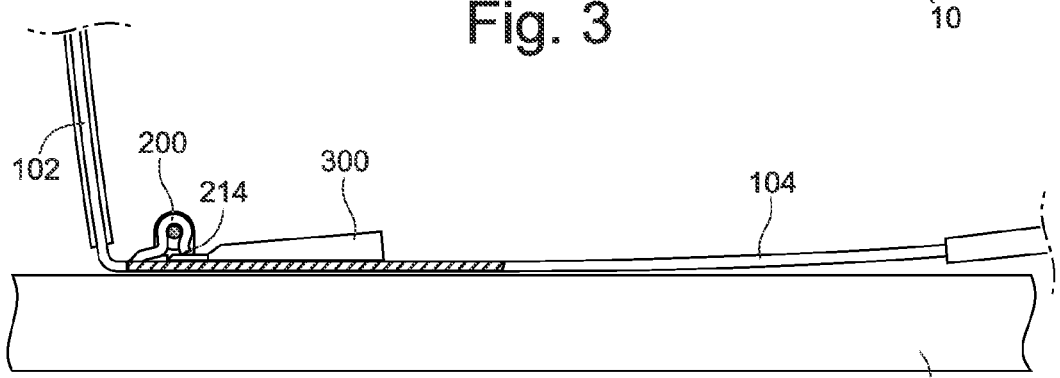

FIGS. 3-6 shows the process for removing a temple 104 from the eyeglass frame 102 using a wedge tool 300. The wedge tool 300 is a thin and narrow piece of generally stiff or hard material, such as plastic, metal, wood, and the like, with a flat bottom surface 302 and wedge tip 304. When the temple 104 is secured to the frame 102 a gap exists between the tip 214 of the eye wire rung 200 and the inner surface 128 of the temple 104. The gap is large enough to allow the front portion of the wedge tip 304 to be inserted in between the free end 214 of the rung 200 and the inner surface 128 of the temple 104. The temple 104 may be placed on a flat surface 10 in the open configuration with the frame 102 generally perpendicular to the flat surface 10. The wedge tool 300 can then be inserted between eye wire rung 200 and the temple 104. As the wedge tool 300 is inserted further along the inner surface 128 of the temple, eventually the tip 214 may make contact with the top surface 306 of the wedge tool 300. At this point the wedge tool 300 is wedged or lodged in between the free end 214 of the eye wire rung 200 and the inner surface 128 of the temple 104 as shown in FIG. 4. The wedge tip 304 of the tool 300 acts as a wedge on the free end 214 of the eye wire rung 200 and holds the free end 214 of the eye wire rung 200 in place against the hard surface of the wedge tool 300. The wedge tool 300 acts as a pivot place holding the end 214 of the eye wire rung 200 in-place and allowing the eye wire rung 200 to expand and open just enough not to bend the frame material out of shape, but enough to release the cylinder 222. This is important in order to keep the tension of the semi-circular eye wire rung 200 from stretching out of shape/alignment and keeping it consistent in order to be able to frequently dismantle the front of the frame 102 with the temple 104 and prevent it from coming too loose in the future. With the wedge 300 securely in place between the gap, the front of the frame 102 may be rotated toward the temple 104.

Figure 5:
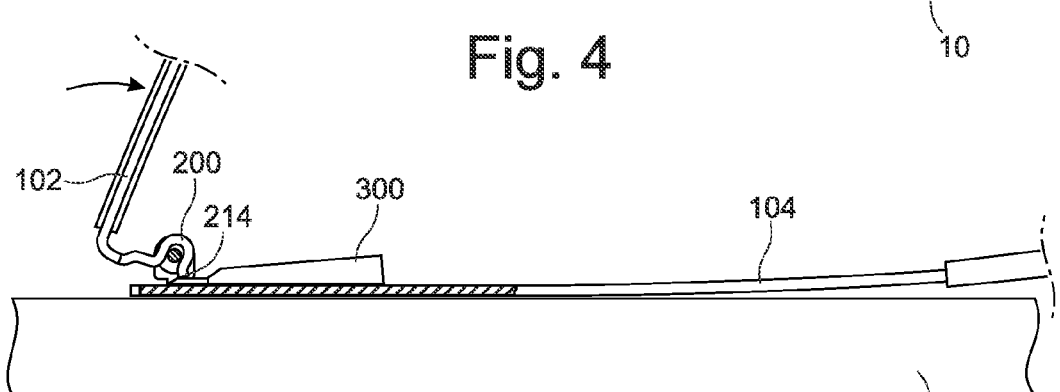
Figure 6:
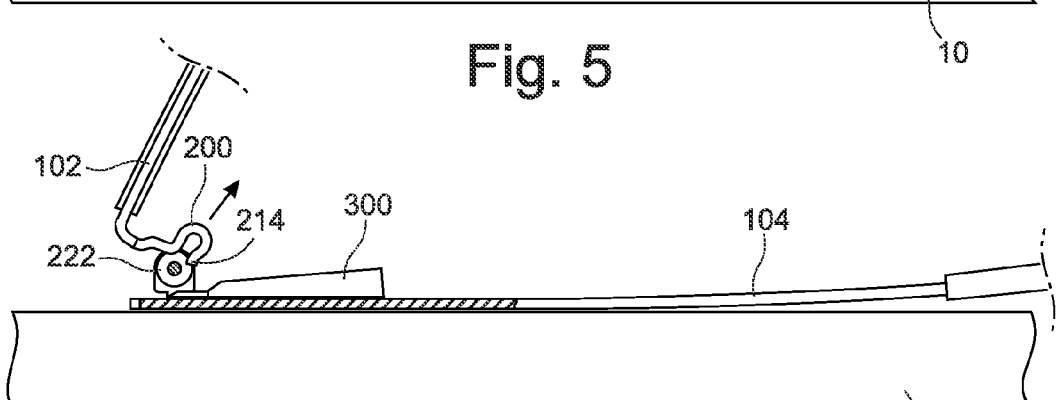

As shown in FIG. 5, the temple 104 and frame 102 can be slowly moved into the closed configuration. This can be achieved by rotating the frame 102 towards the temple 104 or by rotating the temple 104 towards the frame 102. This rotational movement causes the free end 214 of the eye wire rung 200 to create a force against the top surface 306 of the wedge tool 300. This force causes the eye wire rung 200 to move away from the cylinder 222 and at the same time cause the eye wire rung 200 to expand or open slightly, allowing the cylinder 222 to pop out of the eye wire rung 200 as shown in FIG. 6. For frames 102 having split ends 116, this permits the lenses 110 to be removed from the eye wire 112.

In some embodiments, the wedge tool 300 may not necessarily be tapered as long as it fits into the gap between the free end 214 of the eye wire rung 200 and the inner surface 128 of the temple 104 with the gap so small that slight movement of the frame 102 or temple 104 towards the closed position causes contact of the free end 214 of the eye wire rung 200 to the upper surface 306 of the wedge tool 300 to allow the temples 104 to pop off of the frame.

Figure 7:
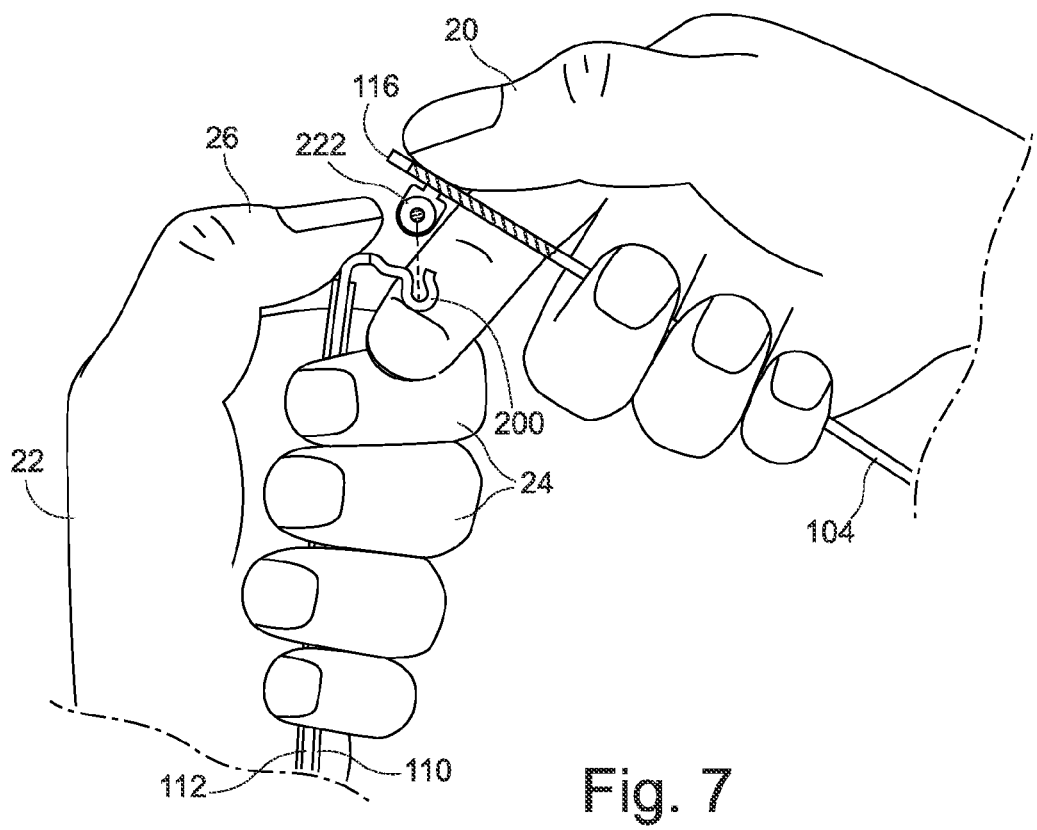
FIGS. 7-9 show the process of replacing the temple back onto the frame.
Figure 8:
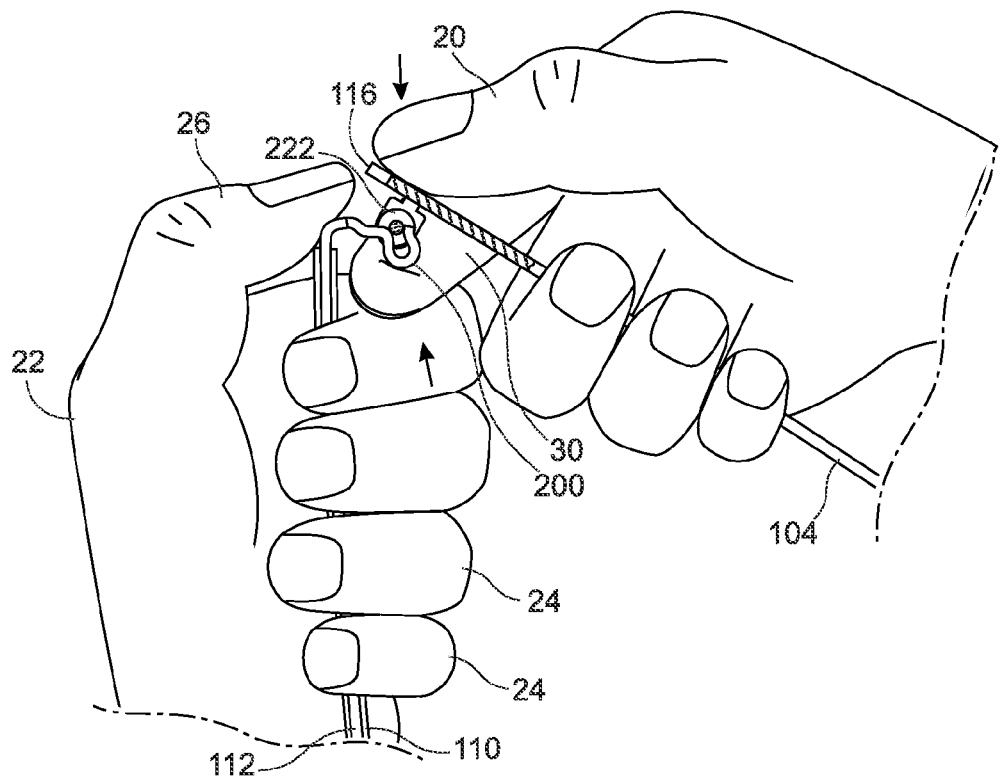
Figure 9:
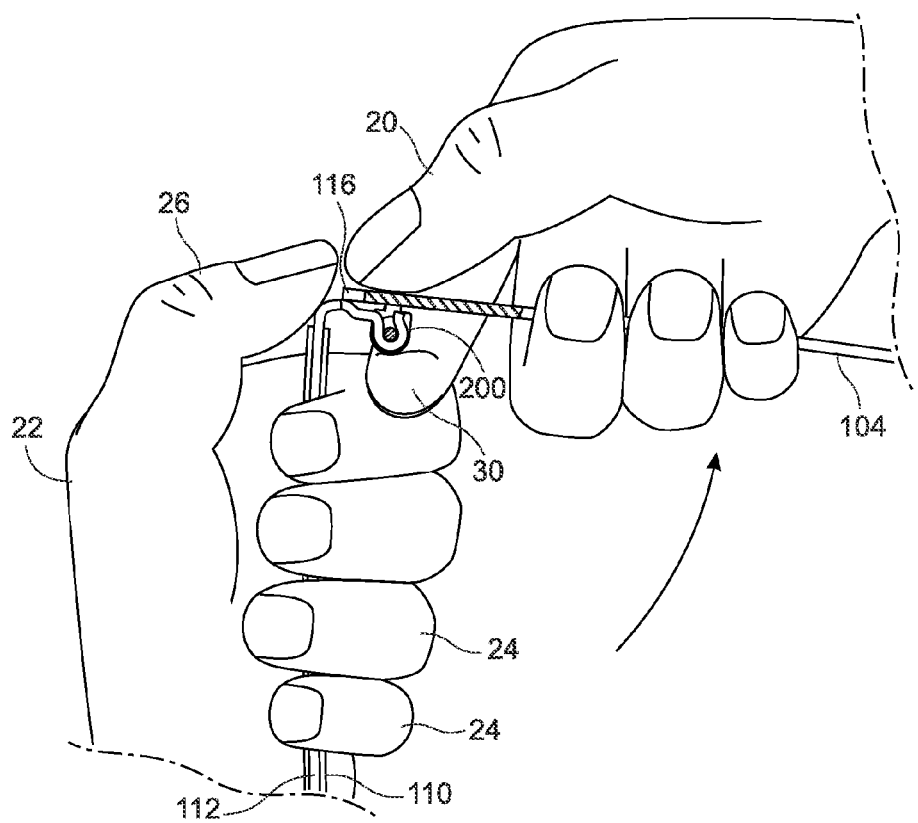
Figure 10:
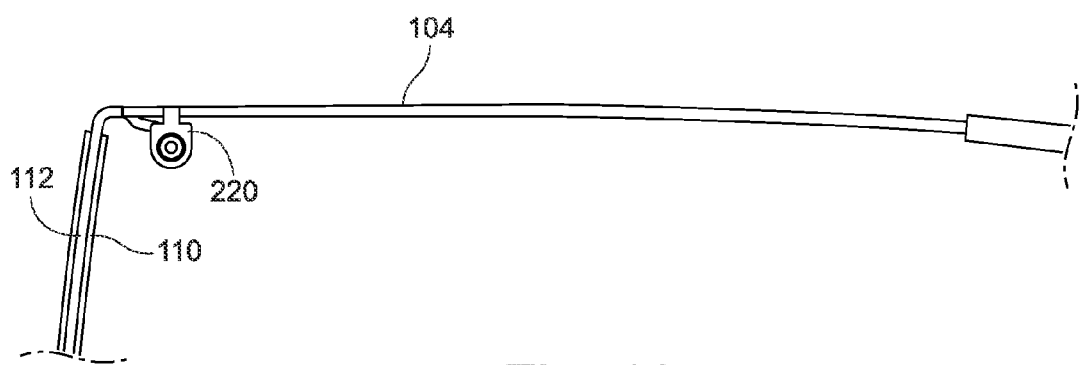
FIG. 10 shows a partial top view of the temple replaced back onto the frame.

To replace the temple 104 back onto the frame a person can grasp the temple 104 with his thumb 20 on the outer surface 126 of the temple 104 just behind the cylinder 222. The person can grasp the frame 102 in the opposite hand 22 with his fingers 24 wrapped around the wire frame and his thumb 26 buttressed against the end piece 116 to hold the top and bottom end pieces flush together to create a tight seam between one another. The other fingers 24 of the same hand may grasp the top and bottom part of the eye wire pressing them toward each other with the palm of the hand 22 and fingers 24 so as to hold the lens 110 in place between the eye wire 112. In embodiments where the end piece is split this hold will help keep the split pieces together while the temple 104 is being put back one With the temple 104 angled at an oblique angle relative to the frame 102 (for example between 10 degrees and 80 degrees relative to the frame), the cylinder 222 can be placed at the opening of the eye wire 200 with the cylinder 222 resting against the bent curve 215 of the eye wire rung 200 and the eye wire arm 208, as shown in FIG. 7. The person can then apply a pinching force between the index finger 30 and thumb 20 by moving his thumb 20, which is positioned behind the cylinder 222, towards his index finger 30 and moving his index finger 30, which is behind the eye wire rung 200, towards his thumb 20 as shown in FIG. 8. Simultaneously, the person rotates the temple 104 to its open configuration, or approximately 90 degrees relative to the frame 102 as shown in FIG. 9. This action causes the cylinder 222 to pop into the eye wire rung 200 as shown in FIG. 10.

The slightly bent curve 215 causes the free end 214 to bend outward on the end of the eye wire rung 200 so as to prevent the free end 214 of the outer-most edge of the eye wire rung 200 from being bent out of place when applying pressure with the fingers to snap the cylinder 222 on the temple 104 back on to the eye wire rung 200 on the frame 102. This slightly bent curve 215 may create a smooth surface area on the outside surface 206 of the eye wire rung 200 allowing the cylinder 222 to snap easily and securely to the eye wire rung 200, thus holding the lens 110 in place.

This slightly bent curve 215 creates a forward-lateral protrusion on the outside surface 206 area of the slightly bent curve on the eye wire rung 200 to prevent the rung 200 from popping off or dislodging from the cylinder 222 of the hinge mechanism 106b by partially wrapping around the cylinder 222. The precision and calibration of the slightly bent curve 215 on the outside surface area of the eye wire rung 200 may create a secure interlocking fit between the cylinder 222 and the rung 200 and may allow the eye wire rung 200 to rotate around the cylinder 222 with ease as well as hold the lens 110 tightly in place by keeping the end pieces 118, 120 together. This slightly bent curve 215 and inward protrusion on the eye wire rung 200 may also create the dual purpose of generating tension to keep the rung 200 in place, while permitting flexibility in the eye wire rung 200. This dual flexibility and tension on the slightly bent curve 215 and inward protrusion with its smooth surface area on the inside of the eye wire rungs 200 also allows the temples 104 to be taken off and on repeatedly without creating misalignments as well as maintaining a consistent calibration with a tight and secure fit between the cylinder 222 on the temple 104 and eye wire rung 200 on the front of the frame 102.

The slightly bent curve 215 on the eye wire rung 200 helps prevent friction and natural wear-and-tear from the frequent rotating of the hinge when the temples 104 are opened and closed. Without the slightly bent curve 215 and inward protrusion on the end of the eye wire rungs 200, the outer-most edge 225 of the eye wire rung 200 may cause the cylinder 222 or eye wire rung 200 to wear over time with the frequent opening and closing of the temple 104.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of removing and assembling temples to an eyeglass frame, comprising:
  a. providing a frame comprising a rim, a pair of end pieces projecting from the rim, each end piece terminating at an eye wire rung, each eye wire rung operatively connected to a hinge mechanism, each hinge mechanism operatively connected to a temple;
  b. inserting a wedge tool in between a first temple and a first eye wire rung while the first temple is in an open configuration; and
  c. rotating the first temple relative to the frame about an axis defined by a first hinge mechanism causing the first eye wire rung to abut against the wedge tool and expand to cause the first eye wire rung to disassemble from the first hinge mechanism.

2. The method of claim 1, further comprising:
  d. grasping the first temple with a user's first thumb abutting an outer surface of the first temple opposite the first hinge mechanism;
  e. grasping the frame in the user's opposite hand with the user's fingers wrapped around the frame and the user's second thumb buttressed against a first end piece;
  f. with the first temple angled at an oblique angle relative to the frame, positioning the first hinge mechanism against the first eye wire rung;
  g. positioning the user's first index finger against the first eye wire rung opposite the first hinge mechanism;
  h. applying a pinching force between the user's first index finger and the user's first thumb while simultaneously rotating the first temple to the open configuration.

3. The method of claim 1, wherein each eye wire rung comprises a bent curve causing a free end of the eye wire rung to bend laterally and posteriorly relative to the frame.

4. The method of claim 3, wherein the bent curve defines a smooth surface area on an outside surface of the eye wire rung to allow a cylinder of the hinge mechanism to snap in place.

5. The method of claim 3, wherein the bent curve creates a forward-lateral protrusion on an outside surface area of the eye wire rung to prevent the eye wire rung from dislodging from a cylinder of the hinge mechanism.

* * * * *